United States Patent
Grob et al.

(10) Patent No.: US 8,588,777 B2
(45) Date of Patent: *Nov. 19, 2013

(54) METHOD AND APPARATUS FOR ROBUST HANDOFF IN WIRELESS COMMUNICATION SYSTEMS

(75) Inventors: Matthew Stuart Grob, La Jolla, CA (US); Roberto Padovani, San Diego, CA (US); Paul E. Bender, San Diego, CA (US); Gadi Karmi, San Diego, CA (US); Robert H. Kimball, San Diego, CA (US); Greg M. Hoagland, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 889 days.

This patent is subject to a terminal disclaimer.

(21) Appl. No.: 11/619,550

(22) Filed: Jan. 3, 2007

(65) Prior Publication Data

US 2007/0105584 A1    May 10, 2007

Related U.S. Application Data

(63) Continuation of application No. 10/020,036, filed on Dec. 7, 2001, now Pat. No. 7,233,794, and a continuation of application No. 09/158,665, filed on Sep. 22, 1998, now Pat. No. 6,360,100.

(51) Int. Cl.
*H04W 36/00* (2009.01)
(52) U.S. Cl.
USPC ........... 455/436; 455/422; 455/437; 455/438; 455/439
(58) Field of Classification Search
USPC ........ 455/442, 437, 450, 436, 439, 443, 67.1, 455/449; 370/331, 332, 335, 491
See application file for complete search history.

(56) References Cited

U.S. PATENT DOCUMENTS

| 4,833,701 A | 5/1989 | Comroe et al. |
| 5,117,502 A * | 5/1992 | Onoda et al. ................. 455/437 |

(Continued)

FOREIGN PATENT DOCUMENTS

| AU | 2002353616 | 5/2003 |
| CL | 36022006 | 6/2007 |

(Continued)

OTHER PUBLICATIONS

International Search Report—PCT/US99/021759—International Search Authority, European Patent Office—Dec. 16, 1999.

(Continued)

*Primary Examiner* — Jinsong Hu
*Assistant Examiner* — Michael Nguyen

(57) ABSTRACT

A communication system that allows a soft handoff to be completed, even when the communications link between the active base station and the mobile station deteriorates before the mobile station has received the handoff direction message. The mobile station maintains a list of base stations that the mobile station is in communication with, referred to as an "Active Set". In addition, the mobile station maintains another list of base stations that are proximate to the base stations in the active set. This list is referred to as the "Neighbor Set". In accordance with the disclosed method and apparatus, the mobile station places a base station in the active set upon including the base station in a pilot strength measurement message (PSMM). The mobile station monitors transmissions from all of the base stations on the active set to receive a handoff direction message (HDM).

17 Claims, 7 Drawing Sheets

(56) References Cited

U.S. PATENT DOCUMENTS

| | | |
|---|---|---|
| 5,128,938 A | 7/1992 | Borras |
| 5,200,952 A | 4/1993 | Bernstein et al. |
| 5,208,837 A | 5/1993 | Richey |
| 5,229,992 A | 7/1993 | Jurkevich et al. |
| 5,247,516 A | 9/1993 | Bernstein et al. |
| 5,251,209 A | 10/1993 | Jurkevich et al. |
| 5,267,261 A * | 11/1993 | Blakeney et al. ............ 370/332 |
| 5,268,933 A | 12/1993 | Averbuch |
| 5,388,102 A | 2/1995 | Griffith et al. |
| 5,490,139 A | 2/1996 | Baker et al. |
| 5,491,835 A | 2/1996 | Sasuta et al. |
| 5,509,027 A | 4/1996 | Vook et al. |
| 5,539,925 A | 7/1996 | Yli-Kotila et al. |
| 5,561,841 A | 10/1996 | Markus |
| 5,572,528 A | 11/1996 | Shuen |
| 5,574,720 A | 11/1996 | Lee |
| 5,594,943 A | 1/1997 | Balachandran |
| 5,694,548 A | 12/1997 | Baugher et al. |
| 5,722,044 A | 2/1998 | Padovani et al. |
| 5,737,328 A | 4/1998 | Norman et al. |
| 5,794,137 A | 8/1998 | Harte |
| 5,854,785 A * | 12/1998 | Willey ........................... 370/332 |
| 5,870,427 A | 2/1999 | Tiedemann, Jr. et al. |
| 5,974,036 A | 10/1999 | Acharya et al. |
| 5,978,366 A | 11/1999 | Massingill et al. |
| 6,016,316 A | 1/2000 | Moura et al. |
| 6,018,521 A | 1/2000 | Timbs et al. |
| 6,031,863 A | 2/2000 | Jusa et al. |
| 6,055,428 A * | 4/2000 | Soliman ........................ 455/437 |
| 6,073,021 A * | 6/2000 | Kumar et al. ................. 455/442 |
| 6,084,969 A | 7/2000 | Wright et al. |
| 6,094,427 A * | 7/2000 | Yi ................................. 370/331 |
| 6,097,952 A | 8/2000 | Kawabata |
| 6,101,394 A | 8/2000 | Illidge |
| 6,137,787 A | 10/2000 | Chawla et al. |
| 6,144,671 A | 11/2000 | Perinpanathan et al. |
| 6,151,502 A | 11/2000 | Padovani et al. |
| 6,157,668 A | 12/2000 | Gilhousen et al. |
| 6,157,833 A | 12/2000 | Lawson-Jenkins et al. |
| 6,157,978 A | 12/2000 | Ng et al. |
| 6,161,008 A | 12/2000 | Lee et al. |
| 6,163,692 A | 12/2000 | Chakrabarti et al. |
| 6,195,705 B1 | 2/2001 | Leung |
| 6,201,971 B1 | 3/2001 | Purnadi et al. |
| 6,256,300 B1 | 7/2001 | Ahmed et al. |
| 6,272,129 B1 | 8/2001 | Dynarski et al. |
| 6,285,665 B1 | 9/2001 | Chuah |
| 6,300,887 B1 | 10/2001 | Le |
| 6,308,267 B1 | 10/2001 | Gremmelmaier |
| 6,345,043 B1 | 2/2002 | Hsu |
| 6,347,091 B1 | 2/2002 | Wallentin et al. |
| 6,360,100 B1 | 3/2002 | Grob et al. |
| 6,366,561 B1 | 4/2002 | Bender |
| 6,370,380 B1 | 4/2002 | Norefors et al. |
| 6,397,065 B1 | 5/2002 | Huusko et al. |
| 6,400,722 B1 | 6/2002 | Chuah et al. |
| 6,445,922 B1 | 9/2002 | Hiller et al. |
| 6,446,127 B1 | 9/2002 | Schuster et al. |
| 6,449,481 B1 | 9/2002 | Kwon et al. |
| 6,456,604 B1 | 9/2002 | Lee et al. |
| 6,466,964 B1 | 10/2002 | Leung et al. |
| 6,473,418 B1 | 10/2002 | Laroia et al. |
| 6,493,725 B1 | 12/2002 | Iwai et al. |
| 6,496,704 B2 | 12/2002 | Yuan |
| 6,510,153 B1 | 1/2003 | Inoue et al. |
| 6,516,352 B1 | 2/2003 | Booth et al. |
| 6,519,457 B1 | 2/2003 | Jiang et al. |
| 6,529,732 B1 | 3/2003 | Vainiomaki et al. |
| 6,535,493 B1 | 3/2003 | Lee et al. |
| 6,553,227 B1 | 4/2003 | Ho et al. |
| 6,587,680 B1 | 7/2003 | Ala-Laurila et al. |
| 6,611,547 B1 | 8/2003 | Rauhala |
| 6,640,248 B1 | 10/2003 | Jorgensen |
| 6,654,363 B1 | 11/2003 | Li et al. |
| 6,671,512 B2 | 12/2003 | Laakso |
| 6,701,155 B2 | 3/2004 | Sarkkinen et al. |
| 6,708,031 B2 | 3/2004 | Purnadi et al. |
| 6,714,524 B1 | 3/2004 | Kim et al. |
| 6,714,777 B1 | 3/2004 | Naqvi et al. |
| 6,714,788 B2 | 3/2004 | Voyer |
| 6,754,492 B1 | 6/2004 | Stammers et al. |
| 6,763,007 B1 | 7/2004 | La Porta et al. |
| 6,768,908 B1 | 7/2004 | Jalloul et al. |
| 6,771,962 B2 | 8/2004 | Saifullah et al. |
| 6,785,256 B2 | 8/2004 | O'Neill |
| 6,807,421 B1 | 10/2004 | Ahmavaara |
| 6,842,621 B2 | 1/2005 | Labun et al. |
| 6,842,630 B2 | 1/2005 | Periyalwar |
| 6,862,446 B2 | 3/2005 | ONeill et al. |
| 6,901,063 B2 | 5/2005 | Vayanos et al. |
| 6,917,605 B2 | 7/2005 | Kakemizu et al. |
| 6,937,566 B1 | 8/2005 | Forslow |
| 6,947,401 B2 | 9/2005 | El-Malki et al. |
| 6,950,650 B2 | 9/2005 | Roeder |
| 6,954,442 B2 | 10/2005 | Tsirtsis et al. |
| 6,965,585 B2 | 11/2005 | Grilli et al. |
| 6,970,445 B2 | 11/2005 | ONeill et al. |
| 6,990,337 B2 | 1/2006 | ONeill et al. |
| 6,990,339 B2 | 1/2006 | Turanyi et al. |
| 6,990,343 B2 | 1/2006 | Lefkowitz |
| 6,992,994 B2 | 1/2006 | Das et al. |
| 6,993,332 B2 | 1/2006 | Pedersen et al. |
| 7,003,311 B2 | 2/2006 | Ebata et al. |
| 7,006,826 B2 | 2/2006 | Cao et al. |
| 7,016,317 B1 | 3/2006 | Pathak et al. |
| 7,047,009 B2 | 5/2006 | Laroia et al. |
| 7,068,640 B2 | 6/2006 | Kakemizu et al. |
| 7,068,654 B1 | 6/2006 | Joseph et al. |
| 7,069,040 B2 | 6/2006 | Iwanaga et al. |
| 7,089,008 B1 | 8/2006 | Back et al. |
| 7,116,654 B2 | 10/2006 | Kim |
| 7,123,599 B2 | 10/2006 | Yano et al. |
| 7,130,291 B1 | 10/2006 | Kim et al. |
| 7,161,913 B2 | 1/2007 | Jung |
| 7,177,641 B1 | 2/2007 | Miernik et al. |
| 7,197,318 B2 | 3/2007 | Schwarz et al. |
| 7,233,583 B2 | 6/2007 | Asthana et al. |
| 7,233,794 B2 | 6/2007 | Grob et al. |
| 7,263,357 B2 | 8/2007 | Lee et al. |
| 7,266,100 B2 | 9/2007 | Le et al. |
| 7,272,122 B2 | 9/2007 | Trossen et al. |
| 7,283,495 B2 | 10/2007 | Lee et al. |
| 7,283,511 B2 | 10/2007 | Hans et al. |
| 7,290,063 B2 | 10/2007 | Kalliokulju et al. |
| 7,336,953 B2 | 2/2008 | Kim et al. |
| 7,369,855 B2 | 5/2008 | Oneill et al. |
| 7,369,859 B2 | 5/2008 | Gallagher |
| 7,376,101 B2 | 5/2008 | Shim et al. |
| 7,389,110 B2 | 6/2008 | Lee |
| 7,391,741 B2 | 6/2008 | Kang |
| 7,403,789 B2 | 7/2008 | Takano et al. |
| 7,408,917 B1 | 8/2008 | Kyung et al. |
| 7,408,950 B2 | 8/2008 | Okuyama |
| 7,409,428 B1 | 8/2008 | Brabec et al. |
| 7,418,264 B2 | 8/2008 | Kim |
| 7,420,957 B2 | 9/2008 | Kim et al. |
| 7,460,504 B2 | 12/2008 | Tsirtsis et al. |
| 7,492,762 B2 | 2/2009 | Chowdhury |
| 7,499,401 B2 | 3/2009 | Buddhikot et al. |
| 7,505,765 B2 | 3/2009 | Frangione et al. |
| 7,515,561 B2 | 4/2009 | Koodli et al. |
| 7,525,940 B2 | 4/2009 | Trossen et al. |
| 7,529,239 B2 | 5/2009 | Seppanen |
| 7,567,639 B2 | 7/2009 | Huh et al. |
| 7,583,592 B2 | 9/2009 | Park et al. |
| 7,593,364 B2 | 9/2009 | Asthana |
| 7,623,493 B2 | 11/2009 | Baba et al. |
| 7,653,415 B2 | 1/2010 | Van Rooyen |
| 7,668,541 B2 | 2/2010 | Oneill et al. |
| 7,672,254 B2 | 3/2010 | Kim et al. |
| 7,702,309 B2 | 4/2010 | Faccin et al. |
| 7,706,739 B2 | 4/2010 | Kjellberg |
| 7,729,350 B2 | 6/2010 | Singh et al. |
| 7,742,781 B2 | 6/2010 | Chen et al. |

(56) References Cited

U.S. PATENT DOCUMENTS

| | | |
|---|---|---|
| 7,773,947 B2 | 8/2010 | Gerlach |
| 7,962,142 B2 | 6/2011 | Oneill et al. |
| 8,112,102 B2 | 2/2012 | Fischer |
| 8,144,664 B2 | 3/2012 | Pani et al. |
| 8,184,615 B2 | 5/2012 | Tsirtsis et al. |
| 2001/0019545 A1 | 9/2001 | Okubo et al. |
| 2002/0061009 A1 | 5/2002 | Sorensen |
| 2002/0064144 A1 | 5/2002 | Einola et al. |
| 2002/0065785 A1 | 5/2002 | Tsuda |
| 2002/0067706 A1 | 6/2002 | Bautz et al. |
| 2002/0075859 A1 | 6/2002 | Mizell et al. |
| 2002/0082038 A1 | 6/2002 | Mochizuki |
| 2002/0085518 A1 | 7/2002 | Lim |
| 2002/0107908 A1 | 8/2002 | Dharanikota |
| 2002/0126701 A1 | 9/2002 | Requena |
| 2002/0136226 A1 | 9/2002 | Christoffel et al. |
| 2002/0161927 A1 | 10/2002 | Inoue et al. |
| 2002/0168982 A1 | 11/2002 | Sorokine et al. |
| 2002/0199012 A1 | 12/2002 | Cable et al. |
| 2003/0009580 A1 | 1/2003 | Chen et al. |
| 2003/0018774 A1 | 1/2003 | Flinck et al. |
| 2003/0026220 A1 | 2/2003 | Uhlik et al. |
| 2003/0027572 A1 | 2/2003 | Karlsson et al. |
| 2003/0036392 A1 | 2/2003 | Yukie |
| 2003/0078047 A1 | 4/2003 | Lee et al. |
| 2003/0092444 A1 | 5/2003 | Sengodan et al. |
| 2003/0103496 A1 | 6/2003 | Lakshmi Narayanan et al. |
| 2003/0104814 A1 | 6/2003 | Gwon et al. |
| 2003/0112766 A1 | 6/2003 | Riedel et al. |
| 2003/0204599 A1 | 10/2003 | Trossen et al. |
| 2003/0212764 A1 | 11/2003 | Trossen et al. |
| 2003/0214922 A1 | 11/2003 | Shahrier |
| 2003/0216140 A1 | 11/2003 | Chambert |
| 2003/0217096 A1 | 11/2003 | McKelvie et al. |
| 2003/0227871 A1 | 12/2003 | Hsu et al. |
| 2004/0002362 A1 | 1/2004 | Chuah et al. |
| 2004/0004736 A1 | 1/2004 | Ogura et al. |
| 2004/0004967 A1 | 1/2004 | Nakatsugawa et al. |
| 2004/0008632 A1 | 1/2004 | Hsu et al. |
| 2004/0015607 A1 | 1/2004 | Bender et al. |
| 2004/0016551 A1 | 1/2004 | Bennett |
| 2004/0017792 A1 | 1/2004 | Khaleghi et al. |
| 2004/0017798 A1 | 1/2004 | Hurtta et al. |
| 2004/0018841 A1 | 1/2004 | Trossen |
| 2004/0076186 A1 | 4/2004 | Chen et al. |
| 2004/0087319 A1 | 5/2004 | Bos et al. |
| 2004/0090913 A1 | 5/2004 | Scudder et al. |
| 2004/0090937 A1 | 5/2004 | Chaskar et al. |
| 2004/0104544 A1 | 6/2004 | Fan et al. |
| 2004/0116153 A1 | 6/2004 | Kaminski et al. |
| 2004/0120317 A1 | 6/2004 | Forssell |
| 2004/0139201 A1 | 7/2004 | Chaudhary et al. |
| 2004/0151148 A1 | 8/2004 | Yahagi |
| 2004/0151193 A1 | 8/2004 | Rune et al. |
| 2004/0165551 A1 | 8/2004 | Krishnamurthi et al. |
| 2004/0166898 A1 | 8/2004 | Tajima |
| 2004/0179544 A1 | 9/2004 | Wilson et al. |
| 2004/0192307 A1 | 9/2004 | Watanabe et al. |
| 2004/0218607 A1 | 11/2004 | Hurtta et al. |
| 2004/0228301 A1 | 11/2004 | Rudolf et al. |
| 2004/0228304 A1 | 11/2004 | Riedel et al. |
| 2004/0242222 A1 | 12/2004 | An et al. |
| 2004/0253954 A1 | 12/2004 | Lee et al. |
| 2005/0002242 A1 | 1/2005 | O'neill et al. |
| 2005/0020265 A1 | 1/2005 | Funabiki et al. |
| 2005/0053043 A1 | 3/2005 | Rudolf et al. |
| 2005/0058151 A1 | 3/2005 | Yeh |
| 2005/0059417 A1 | 3/2005 | Zhang et al. |
| 2005/0063324 A1 | 3/2005 | O'neill et al. |
| 2005/0063338 A1 | 3/2005 | Tsui |
| 2005/0063389 A1 | 3/2005 | Elliott et al. |
| 2005/0089043 A1 | 4/2005 | Seckin et al. |
| 2005/0128949 A1 | 6/2005 | Ku et al. |
| 2005/0141468 A1 | 6/2005 | Kim et al. |
| 2005/0201324 A1 | 9/2005 | Zheng |
| 2005/0268153 A1 | 12/2005 | Armstrong et al. |
| 2006/0002344 A1 | 1/2006 | Ono et al. |
| 2006/0003768 A1 | 1/2006 | Chiou |
| 2006/0007936 A1 | 1/2006 | Shrum, Jr. et al. |
| 2006/0029028 A1 | 2/2006 | Kim et al. |
| 2006/0056348 A1 | 3/2006 | Marinier et al. |
| 2006/0069809 A1 | 3/2006 | Serlet |
| 2006/0099950 A1 | 5/2006 | Klein et al. |
| 2006/0104232 A1 | 5/2006 | Gidwani |
| 2006/0121883 A1 | 6/2006 | Faccin |
| 2006/0149845 A1 | 7/2006 | Malin et al. |
| 2006/0217119 A1 | 9/2006 | Bosch et al. |
| 2006/0230019 A1 | 10/2006 | Hill et al. |
| 2006/0285520 A1 | 12/2006 | Venkitaraman |
| 2007/0016637 A1 | 1/2007 | Brawn et al. |
| 2007/0019584 A1 | 1/2007 | Qi et al. |
| 2007/0064948 A1 | 3/2007 | Tsirtsis et al. |
| 2007/0066918 A1 | 3/2007 | Dewald et al. |
| 2007/0076653 A1 | 4/2007 | Park et al. |
| 2007/0076658 A1 | 4/2007 | Park et al. |
| 2007/0078999 A1 | 4/2007 | Corson et al. |
| 2007/0081495 A1 | 4/2007 | Tsirtsis et al. |
| 2007/0083669 A1 | 4/2007 | Tsirtsis et al. |
| 2007/0086389 A1 | 4/2007 | Park et al. |
| 2007/0091810 A1 | 4/2007 | Kim et al. |
| 2007/0099618 A1 | 5/2007 | Kim |
| 2007/0105555 A1 | 5/2007 | Miernik et al. |
| 2007/0121542 A1 | 5/2007 | Lohr et al. |
| 2007/0147283 A1 | 6/2007 | Laroia et al. |
| 2007/0147286 A1 | 6/2007 | Laroia et al. |
| 2007/0147377 A1 | 6/2007 | Laroia et al. |
| 2007/0171875 A1 | 7/2007 | Suda |
| 2007/0189282 A1 | 8/2007 | Lohr et al. |
| 2007/0191054 A1 | 8/2007 | Das et al. |
| 2007/0191065 A1 | 8/2007 | Lee et al. |
| 2007/0195788 A1 | 8/2007 | Vasamsetti et al. |
| 2008/0031198 A1 | 2/2008 | Hwang et al. |
| 2008/0051091 A1 | 2/2008 | Phan et al. |
| 2008/0074994 A1 | 3/2008 | Jen |
| 2008/0076424 A1 | 3/2008 | Barber et al. |
| 2008/0089287 A1 | 4/2008 | Sagfors et al. |
| 2008/0146231 A1 | 6/2008 | Huang et al. |
| 2008/0160999 A1 | 7/2008 | Eklund |
| 2008/0240039 A1 | 10/2008 | Parekh et al. |
| 2008/0259855 A1 | 10/2008 | Yoon et al. |
| 2008/0261600 A1 | 10/2008 | Somasundaram et al. |
| 2009/0029706 A1 | 1/2009 | Prakash et al. |
| 2009/0046573 A1 | 2/2009 | Damnjanovic |
| 2009/0175448 A1 | 7/2009 | Watanabe et al. |
| 2009/0181673 A1 | 7/2009 | Barrett |
| 2009/0190556 A1 | 7/2009 | Venkitaraman |
| 2009/0191878 A1 | 7/2009 | Hedqvist et al. |
| 2009/0285218 A1 | 11/2009 | Adamczyk et al. |
| 2011/0019614 A1 | 1/2011 | Oneill et al. |
| 2011/0039546 A1 | 2/2011 | Narasimha et al. |
| 2011/0103347 A1 | 5/2011 | Dimou |
| 2011/0250892 A1 | 10/2011 | Gupta et al. |
| 2011/0268085 A1 | 11/2011 | Barany et al. |
| 2012/0087312 A1 | 4/2012 | Laroia et al. |
| 2012/0327908 A1 | 12/2012 | Gupta et al. |
| 2013/0208709 A1 | 8/2013 | Corson et al. |

FOREIGN PATENT DOCUMENTS

| | | |
|---|---|---|
| CL | 36052006 | 6/2007 |
| CL | 36032006 | 7/2007 |
| CL | 36042006 | 7/2007 |
| CN | 1043052 A | 6/1990 |
| CN | 1133669 A | 10/1996 |
| CN | 1344477 | 4/2002 |
| CN | 1345518 A | 4/2002 |
| CN | 1416284 A | 5/2003 |
| CN | 1481119 A | 3/2004 |
| CN | 1514607 | 7/2004 |
| CN | 1650178 | 8/2005 |
| CN | 1859529 A | 11/2006 |
| EP | 0740440 A2 | 10/1996 |
| EP | 0813346 A1 | 12/1997 |
| EP | 0974895 A2 | 1/2000 |

(56) References Cited

FOREIGN PATENT DOCUMENTS

| | | |
|---|---|---|
| EP | 1088463 A1 | 4/2001 |
| EP | 1128704 A1 | 8/2001 |
| EP | 1345370 A2 | 9/2003 |
| EP | 1458209 A2 | 9/2004 |
| EP | 1473872 A2 | 11/2004 |
| EP | 1489808 A2 | 12/2004 |
| EP | 1507421 A1 | 2/2005 |
| EP | 1565024 A2 | 8/2005 |
| EP | 1720267 A1 | 11/2006 |
| EP | 1764942 A2 | 3/2007 |
| GB | 2322046 | 8/1998 |
| GB | 2395629 A | 5/2004 |
| JP | 2084807 | 3/1990 |
| JP | 08116329 | 5/1996 |
| JP | 11308273 | 11/1999 |
| JP | 2000125343 A | 4/2000 |
| JP | 2001217830 A | 8/2001 |
| JP | 2001237878 A | 8/2001 |
| JP | 2001245355 | 9/2001 |
| JP | 2002111732 A | 4/2002 |
| JP | 2002513527 A | 5/2002 |
| JP | 2002165249 A | 6/2002 |
| JP | 2002281069 A | 9/2002 |
| JP | 2002281539 A | 9/2002 |
| JP | 2002534923 T | 10/2002 |
| JP | 2002537739 | 11/2002 |
| JP | 2003060685 A | 2/2003 |
| JP | 2003111134 A | 4/2003 |
| JP | 2003348007 | 5/2003 |
| JP | 2003304571 A | 10/2003 |
| JP | 2003338833 A | 11/2003 |
| JP | 2004007578 A | 1/2004 |
| JP | 2004104544 A | 4/2004 |
| JP | 2004147228 | 5/2004 |
| JP | 2004201289 A | 7/2004 |
| JP | 2004328637 A | 11/2004 |
| JP | 2005531173 T | 10/2005 |
| JP | 2007513569 | 5/2007 |
| JP | 2007521759 | 8/2007 |
| JP | 2007527177 T | 9/2007 |
| JP | 2008053889 A | 3/2008 |
| JP | 4827994 B1 | 11/2011 |
| KR | 20040004918 A | 1/2004 |
| KR | 20040105069 A | 12/2004 |
| KR | 20050023194 A | 3/2005 |
| KR | 20050065123 | 6/2005 |
| KR | 20050066287 A | 6/2005 |
| KR | 20070031810 A | 3/2007 |
| RU | 2117396 C1 | 8/1998 |
| RU | 2003120063 A | 2/2005 |
| RU | 2256299 C2 | 7/2005 |
| RU | 2005115564 A | 11/2005 |
| RU | 2267864 | 1/2006 |
| RU | 2005129079 A | 2/2006 |
| RU | 2292669 | 1/2007 |
| RU | 2294596 C2 | 2/2007 |
| TW | 200527930 | 8/2005 |
| TW | 200708018 | 2/2007 |
| WO | 9501706 A1 | 1/1995 |
| WO | WO9512297 | 5/1995 |
| WO | 9804094 A1 | 1/1998 |
| WO | 9833288 | 7/1998 |
| WO | WO9847302 | 10/1998 |
| WO | WO9856140 A2 | 12/1998 |
| WO | WO9905828 A1 | 2/1999 |
| WO | WO9927718 | 6/1999 |
| WO | WO9966748 A1 | 12/1999 |
| WO | 0018173 | 3/2000 |
| WO | WO0041401 | 7/2000 |
| WO | WO0041426 A1 | 7/2000 |
| WO | WO0128160 A2 | 4/2001 |
| WO | WO0158196 A1 | 8/2001 |
| WO | WO0163947 | 8/2001 |
| WO | WO0178440 | 10/2001 |
| WO | WO0219746 A1 | 3/2002 |
| WO | WO0243409 A2 | 5/2002 |
| WO | WO0247407 A2 | 6/2002 |
| WO | WO 02056551 A1 | 7/2002 |
| WO | WO03007484 A2 | 1/2003 |
| WO | WO03017582 | 2/2003 |
| WO | WO03092316 A1 | 11/2003 |
| WO | WO03098816 A2 | 11/2003 |
| WO | WO03105516 A1 | 12/2003 |
| WO | 2004039022 A2 | 5/2004 |
| WO | WO2004068739 A1 | 8/2004 |
| WO | WO2004070989 | 8/2004 |
| WO | WO2004075468 A2 | 9/2004 |
| WO | WO2004079949 A1 | 9/2004 |
| WO | WO2004105272 A1 | 12/2004 |
| WO | WO2004107638 A2 | 12/2004 |
| WO | WO2005029790 | 3/2005 |
| WO | 2005048629 A1 | 5/2005 |
| WO | WO2005062633 | 7/2005 |
| WO | WO2005084146 A2 | 9/2005 |
| WO | WO2005120183 A2 | 12/2005 |
| WO | WO2006002676 A1 | 1/2006 |
| WO | WO2006083131 A1 | 8/2006 |
| WO | WO2008113373 A1 | 9/2008 |

OTHER PUBLICATIONS

International Preliminary Examination Report—PCT/US99/021759—IPEA, US—Nov. 26, 2000.
Pallini, Gregory P. "Trends in Handover Design" IEEE 34(3) P82-90 Mar. 1996.
3GPP, "3rd Generation Partnership Project, Technical Specification Group Radio Access Network, E-UTRAN Mobility Evaluation and Enhancement,(Release 9)", 3GPP Draft, R1-090856 TP for TR for Mobility Studies, 3rd Generation Partnership Project (3GPP), Mobile Competence Centre, 650, Route Des Lucioles, F-06921 Sophia-Antipolis Cedex, France, no. Athens, Greece, 20090203, Feb. 3, 2009, XP050318707.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9 ) , 3GPP Standard; 3GPP TS 36.300, 3rd Generation Partnership Project (3GPP), Mobile Competence Centre ; 650, Route Des Lucioles ; F-06921 Sophia-antipolis Cedex ; France, No. V9.2.0, 7 Jan. 2010, pp. 1-178, XP050401821, [retrieved on Jan. 7, 2010].
"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles ; F-06921 Sophia-Antipolis Cedex; France, No. V8.2.0, May 1, 2008, pp. 1-151, XP050377645.
3rd Generation Partnership Project; Technical Specification Group Radio Access Network; Evolved Universal Terrestrial Radio Access (E-UTRA) Radio Resource Control (RRC); Protocol specification (Release 9), 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V9.1.0, Jan. 7, 2010, pp. 1-221, XP050401822, [retrieved on Jan. 7, 2010].
Baker, F., IETF, "RSVP Management Information Base Using SMIv2," Network Working Group, Request for Comments: 2206, pp. 1-64 (Sep. 1997).
Berger, L., et al., "RSVP Extensions for IPSEC Data Flows," IETF, Network Working Group, Request for Comments: 2207, pp. 1-14 (Sep. 1997).
Berger, L., "RSVP Refresh Overhead Reduction Extensions," IETF Network Working Group, Request for Comments: 2961, pp. 1-32 (Apr. 2001).
Bos et al., "A Framework for End-to-End Perceived Quality of Service Negotiation", IETF Internal Draft, draft-bos-mmusic-sdpqos-framework-00.txt, Nov. 2001, pp. 1-22.
Braden, R., "Resource ReSerVation Protocol (RSVP)—Ver. 1, Message Processing Rules," IETF, Network Working Group, Request for Comments: 2209, pp. 1-24 (Sep. 1997).

(56) References Cited

OTHER PUBLICATIONS

Braden, R., "Resource ReSerVation Protocol (RSVP)—Ver. 1 Functional Specification". IETF, Network Working Group, Request for Comments: 2205, pp. 1-105 (Sep. 1997).
Camarillo, G., et al., "Integration of Resource Management and SIP," IETF Internet Draft, draft-ietf-sip-manyfolks-resource-04.ps, Feb. 25, 2002, pp. 1-18.
Campbell, Andrew T. et al., "IP Micro-Mobility Protocols", Mobile Computing and Communications Review (MC2R), vol. 4, No. 4, pp. 45-53, (Oct. 2001).
ETRI, "Source Specific Multicast (SSM) Explicit Multicast (Xcast)" pp. 1-27 (Jun. 28, 2001).
European Search Report—EP06025867, Search Authority—Munich Patent Office, Apr. 2, 2007.
European Search Report—EP09011515, Search Authority—Munich Patent Office, Oct. 5, 2009.
Ho, Michael. "Integration AAA with Mobile IPv4", Internet Draft, pp. 1-59, Apr. 2002.
Huawei, et al.,"Clarification of definitions of HO failure cases", RAN3, 3GPP Draft; 36300_CR0202_(REL-9)_R2-101906_R3-100635, 3rd Generation Partnership Project (3GPP), Mobile Competence Centre; 650, Route Des Lucioles; F-06921 Sophia-Antipolis Cedex; France, vol. RAN WG2, no. San Francisco, USA; 20100222, Mar. 4, 2010, XP050422194, [retrieved on Mar. 4, 2010].
Ian F.A., et al., "Mobility Management in Next-Generation Wireless Systems", Proceedings of the IEEE, IEEE. New York, us, vol. 87, No. 8, Aug. 1, 1999 , XP011044241, ISSN: 0018-9219.
Johnson, D., et al., IETF Mobile IP Working Group, "Mobility Support in IPv6," ; Feb. 26, 2003 Downloaded From http://www.join.uni-muenster.de on Dec. 29, 2004, pp. 1-169.
Karagiannis, Georgios. "Mobile IP: State of the Art Report," Ericsson, No. 3/0362-FCPNB 102 88 UEN, pp. 1-63, (Jul. 13, 1999).
Koodli, R. et al.: "Fast Handovers and Context Transfers in Mobile Networks" Computer Communication Review, ACM, New York, NY, US, vol. 31, No. 5, Oct. 1, 2001, pp. 37-47, XP001115324 ISSN: 0146-4833 abstract p. 2, right-hand column, last paragraph—p. 3, left-hand column, paragraph 3 p. 5, right-hand column, last paragraph—p. 7, right-hand column, last paragraph.
Leon-Garcia, Alberto; "Communication Networks: Fundamental Concepts and Key Architectures" McGraw-Hill; 2nd Edition; Copyright 2004, pp. 44-52, 429-431.
Li, Yalun et al. "Protocol Architecture for Universal Personal Computing," IEEE Journal on Selected Areas in Communications, IEEE Inc. New York, US, vol. 15, No. 8, Oct. 1, 1997, pp. 1467-1476, XP000721278 ISSN: 0733-8716.
Loughney, J. et al. "Context Transfer Protocol (CXTP)" IETF Standard, Request for Comments: 4067, Internet Engineering Task Force, IETF, CH, Jul. 2005, XP015041932 ISSN: 0000-0003 pp. 1 to 33.
ManKin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Marshall, W. et al. "Integration of Resource Management and SIP: SIP Extensions for Resource Management," IETF Internet Draft, draft-ietf-sip-manyfolks-resource-02.txt, Aug. 2001, pp. 1-28.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Moy, J., "OSPF Version 2", Network Working Group, Request for Comments: 2328, pp. 1-244 (Apr. 1998).
Nortel: "Forward Hand-Off options", R2-071980, 3GPP TSG-RAN WG2 Meeting #58, Kobe, Japan, May 7-11, 2007, sections 2-3.
Panasonic, "Necessity of forward handover", 3GPP Draft, R2-062146, 3rd Generation Partnership Project (3GPP), Mobile Competence Centre, 650, Route Des Lucioles, F-06921 Sophia-Antipolis Cedex, France, vol. RAN WG2, no. Tallinn, 20060823, Aug. 23, 2006, XP050131764,.
Papalilo, D. et al. "Extending SIP for QoS Support", www.coritel.it/publications/IP_download/papalilo-salsano-veltri.pdf, Dec. 8, 2001, pp. 1-6.
Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.
Perkins, C., "IP Mobility Support", IBM, Network Working Group, Request for Comments: 2002, pp. 1-79 (Oct. 1996).
Rosenberg J et al:RFAC 3261: "SIP: Session Initiation Protocol" 20020601; 20020600, Jun. 1, 2002, pp. 1-269, XP015009039.
Schulzrinne et al., "Application-Layer Mobility Using SIP", 0-7803-7133 IEEE, pp. 29-36, Jan. 2000.
Takako Mita, et al., A Proposal for Seamless QoS Support in Mobile Networks, Research Report of Information Processing Society 2004-MBL-29, Japan, Information Processing Society of Japan, May 13, 2004, vol. 2004, No. 44, pp. 129 to 134.
Thulasi, A., et al., "IPv6 Prefix Delegation Using ICMPv6", Network Working Group, Hewlett-Packard, pp. 1-33, Apr. 2004.
TIA/EIA/IS-707A.8 "Data Service Options for Spread Spectrum Systems: Radio Link Protocol Type 2" pp. 1-1:4:12 (Mar. 1999).
Trossen, D. et al., "A Dynamic Protocol for Candidate Access-Router Discovery", pp. 1-36 Mar. 14, 2003.
Valko, A.G. et al.: "Cellular IP: A New Approach to Internet Host Mobility" Computer Communication Review, Association for Computing Machinery. New York, USvol. 29, No. 1, Jan. 1999, pp. 50-65, XP000823873 ISSN: 0146-4833, p. 56, Line 7-Line13.
Wedlund et al: "Mobility Support Using SIP", Proc. of ACM/IEEE International Conference on Wireless and Mobile Multimedia (WoWMoM '99), Seattle, Washington, Aug. 1999.
Wroclawski, J., "The Use of RSVP with IETF Integrated Services," IETF, Network Working Group, Request for Comments: 2210, pp. 1-31 (Sep. 1997).
Zhou, S., et al., "A Location Management Scheme for Mobility Support in Wireless IP Networks Using Session Initiation Protocol (SIP)", 1531-2216/01 IEEE, pp. 486-491, Oct. 2001.
Zte, et al., "Handover Cause Report for Mobility Robustness Optimization", 3GPP.
Draft; R3-092982, 3rd Generation Partnership Project (3GPP), Mobile Competence Centre ; 650, Route Des Lucioles ; F-06921 Sophia-Antipolis Cedex ; France, no. Jeju; 20091109, Nov. 9, 2009 , XP050392455, [retrieved on Nov. 19, 2009].
Basic Knowledge of Communications Term of Switching HUB, URL, http://www.wdic.org/w/WDIC/%E3%82%B9%E3%82%A4%E3%83%83%E3%83%81%E3%83%B3%E3%82%B0HUB.
Droms, R.: "Dynamic Host Configuration Protocol," IETF Standard, RFC 2131, Internet Engineering Task Force, IETF, CH, pp. 1-45, (Mar. 1997) XP015007915.
"Network Layer Protocol," Jul. 13, 2002, chap. 6, pp. 1-35, URL: http://www2.yamanashi-ken.ac.jp/~itoyo/lecture/network/network06/index06.htm.
"Terms for Use in Textbooks and Lectures on Distributed Computing," Feb. 13, 2005, URL: http://web.archive.org/web/20050213090736/http://www.nuis.ac.jp/~nagai/lecture/dce.html.
3GPP TS 36.423, "3rd Generation Partnership Project; Technical Specification Group Radio Access Network; Evolved Universal Terrestrial Radio Access (E UTRA) and Evolved Universal Terrestrial Radio Access Network (EUTRAN); X2 Application Protocol (X2AP)", version 0.0.1, Release 8, year 2007, pp. 9.
Mockapetris, P.,"Domain Names—Implentation and Specification", IETF RFC 1035, Nov. 1987.

* cited by examiner

METHOD AND APPARATUS FOR ROBUST HANDOFF IN WIRELESS COMMUNICATION SYSTEMS

CLAIM OF PRIORITY UNDER 35 U.S.C. §120

The present Application for Patent is a Continuation and claims priority to patent application Ser. No. 10/020,036, entitled "Method for Robust Handoff in Wireless Communication System," filed Dec. 7, 2001, now allowed, which is a continuation application of U.S. Pat. No. 6,360,100, issued Mar. 19, 2002, entitled "Method for Robust Handoff in Wireless Communication System," and assigned to the assignee hereof and hereby expressly incorporated by reference herein.

BACKGROUND

1. Field

The present invention relates to the field of telecommunications, and more particularly to an improved method and system for handing off communications between cells or sectors of a wireless communication system.

2. Background

Wireless cellular communications is becoming a convention method for people to communicate with one another. A conventional wireless cellular communication system in accordance with an industry standard commonly known as IS-95B, which is issued by the Telecommunications Industry Association and Electronics Industry Association (TIA/EIA) defines the way in which one type of wireless cellular communications are performed. In accordance with IS-95B, a mobile station (such as a wireless cellular mobile telephone) communicates with other mobile stations, a conventional telephone, or other such communication devices over a communications link that includes at least one cellular base station. The mobile station transmits a radio signal to the cellular base station. The cellular base station establishes a connection to a wired network that might include conventional telephone circuits (commonly known as the public switched telephone network (PSTN)).

A mobile station need only establish communication through one base station at a time in order to communicate with a device at the other end of the communications link (i.e., make a "call"). However, as a mobile station moves, the mobile station and the base station may lose the ability to communicate over the radio link. For example, if the mobile station moves outside the range of the base station or if an obstruction comes between the mobile station and the base station, the communications between the mobile and base stations will be interrupted. Therefore, the placement of base stations is planned such that there is an overlap between the coverage areas of each base station. This overlap ensures that a mobile station can contact at least one base station in every geographic point intended to be covered by the system. This is important because if the mobile loses contact with all base stations for any substantial amount of time, the call is "dropped". Once a call is dropped, the call must be reestablished by the mobile station redialing the call.

Due to the substantial overlap between base station coverage areas, a procedure known as "soft handoff" can be performed. Soft handoff is a process in which the mobile station receives identical signals from both a first and a second base station. A mobile station will preferably enter soft handoff (i.e., signals from a second base station will be received by the mobile station) whenever a second station becomes available. Soft handoff ensures that a call is not dropped as the mobile station moves out of the coverage area of a first base station and into the coverage area of a second base station.

One conventional method for performing a soft handoff is illustrated in FIG. 1. FIG. 1 shows a mobile station 101, a first base station 103, a second base station 105, and a mobile switching center (MSC) 107. In addition, the time sequence of communications between each is illustrated as follows. Arrowheads that terminate on the vertical line 109 that descends from the mobile station 101, for example, represent signals received by the mobile station 101. Arrows that terminate without an arrow head (i.e., at originate) at the vertical line 109 represent signals that have been transmitted from the mobile station 101. Arrows that are closer to the top of the figure represent signals that are transmitted before signals represented by arrows closer to the bottom of the figure. In some instances, an arrow that is above another arrow may represent a signal that is transmitted continuously and thus may be transmitted concurrent with the signal represented by the lower arrow. For example, the traffic signal represented by arrow 111 may continue to be transmitted concurrent with the pilot strength measurement message (PSMM) that is represented by arrow 113.

As shown in FIG. 1, the traffic signal 111 is initially transmitted between the mobile station 101 and the base station 103. The traffic that is transmitted from the mobile station 101 to the base station 103 is then sent on to the MSC 107 by the base station 103. Likewise, traffic that originates at the MSC 107 is sent to the base station 103. This traffic is then transmitted from the base station 103 to the mobile station 101. When the mobile station 101 detects a pilot from the second base station 105 with sufficient power, the mobile station 101 transmits a PSMM to the first base station 103 indicating the pilot strength of all the pilots that are currently being received at a signal level that is above a predetermined threshold. In the case shown in FIG. 1, the PSMM indicates that the mobile station 101 is receiving pilot signals that are above the predetermined threshold from both the first base station 103 and the second base station 105. This PSMM is then transmitted from the first base station 103 to the MSC 107, as represented by arrow 115. The MSC 107 responds to the receipt of this PSMM by requesting the second base station 105 to allocate resources to establishing a communication link between the second base station 105 and the mobile station 101, as represented by the block 116. In addition, the MSC 107 generates a handoff direction message (HDM). The HDM is transmitted from MSC 107 to the first base station 103, represented by the arrow 117, after a time delay, represented by the arrow 119. The HDM message is then transmitted from the first base station 103 to the mobile station 101, represented by the arrow 121. The HDM indicates to the mobile station 101 that a request has been made for the second base station 105 to allocate resources to establishing a communications path between the second base station 105 and the mobile station 101.

The mobile station 101 responds to the HDM by adding the second base station 105 to the "Active Set" in the mobile station 101 and transmitting a handoff completion message (HDM) to both the first base station 103 and the second base station 105, represented by the arrows 123, 125. Both the first and second base stations 103, 105 transmit the HCM to the MSC 107, represented by the arrows 127, 129. The active set in the mobile station 101 indicates which base stations are actively in communication with the mobile station 101. Traffic will then be transmitted from the MSC 107 to the mobile station 101 through both the first and second base stations 103, 105.

This procedure works well in most cases. However, in some cases, the pilot transmitted from the second base station 105 is received by the mobile station shortly before the signals received from the first base station 103 can no longer be received by the mobile station 101. If the time delay between receipt of the PSMM 115 and the transmission of the HDM from the first base station 103 is such that the communication link between the mobile station 101 and the first base station 103 deteriorates before the HDM can be received from the first base station 103 by the mobile station 101, then the call will drop.

SUMMARY OF THE INVENTION

The disclosed method and apparatus allows a soft handoff to be completed, even when the communications link between the active base station and the mobile station deteriorates before the mobile station has received the handoff direction message. The mobile station maintains a list of base stations that the mobile station is in communication with, referred to as an "Active Set". In addition, the mobile station maintains another list of base stations that are proximate to the base stations in the active set. This list is referred to as the "Neighbor Set". A memory within the mobile station includes information that would allow the mobile station to demodulate information transmitted from those base stations on the neighbor set. In accordance with the disclosed method and apparatus, the mobile station places a base station in the active set upon including the base station in a pilot strength measurement message (PSMM). Alternatively, the mobile station places a base station in the active set upon detecting that the signals transmitted from that base station are being received at a signal strength that is greater than a predetermined threshold.

The mobile station will monitor transmissions from all of the base stations on the active set. When a PSMM transmitted from the mobile station is received by the base station, the base station will transmit the PSMM to the mobile switching center (MSC). The MSC then requests each of the base stations indicated in the PSMM to allocate resources to the mobile station and to send a handoff direction message (HDM). Accordingly, even if the communication with the base station through which the mobile is currently receiving traffic fails before that base station has successfully transmitted the HDM to the mobile station, the mobile station will receive the HDM from each of the other base stations that were indicated in the PSMM sent by the mobile station. Since each of these base stations will be included in the mobile station's active set, the mobile station will monitor the communications from each such base station and thus receive the HDM.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples disclosed should be considered as exemplars, rather than as limitations on the present invention.

Figure 1:
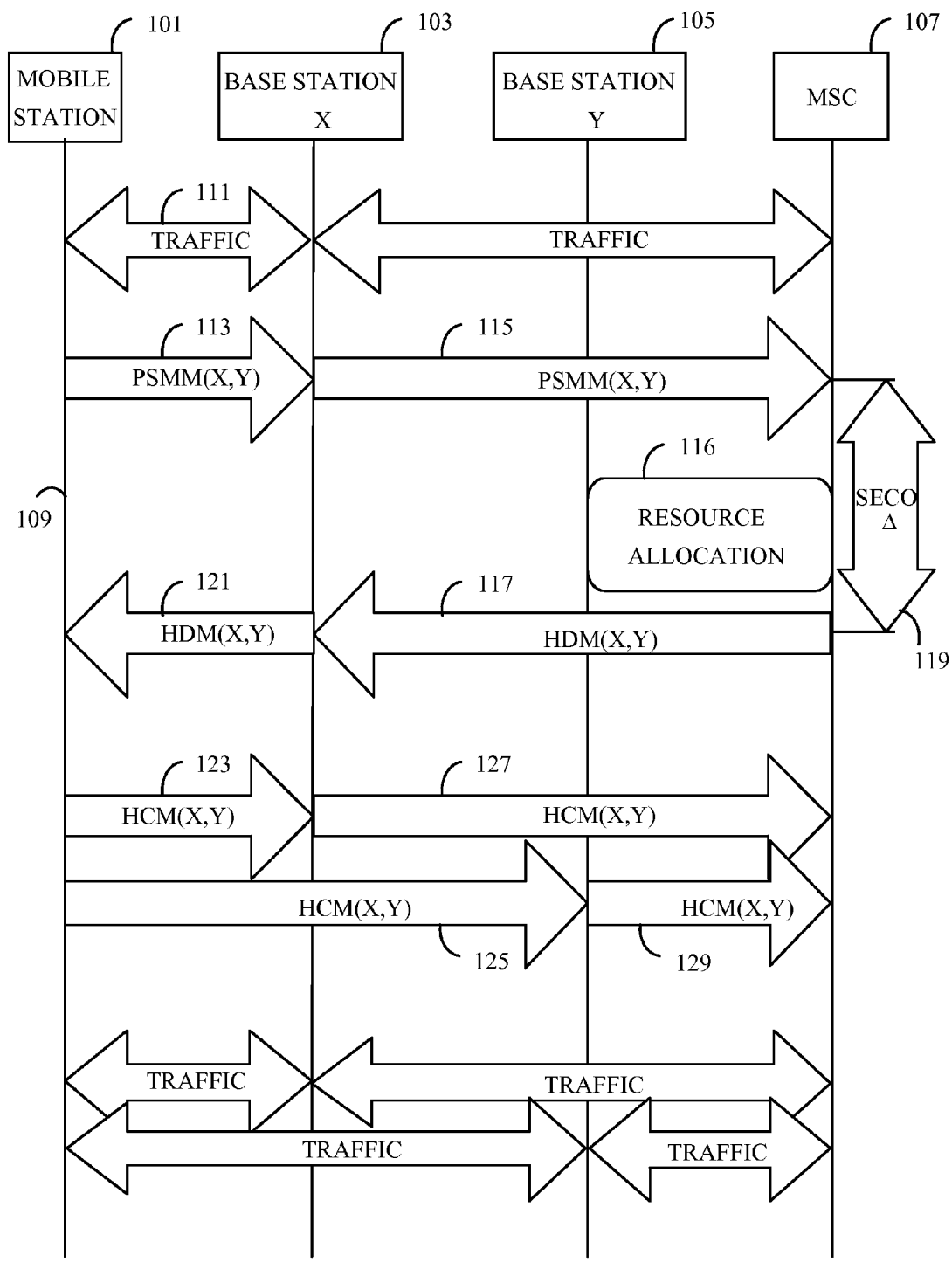
FIG. 1 is an illustration of one method for performing soft handoffs in accordance with the prior art.
Figure 2:
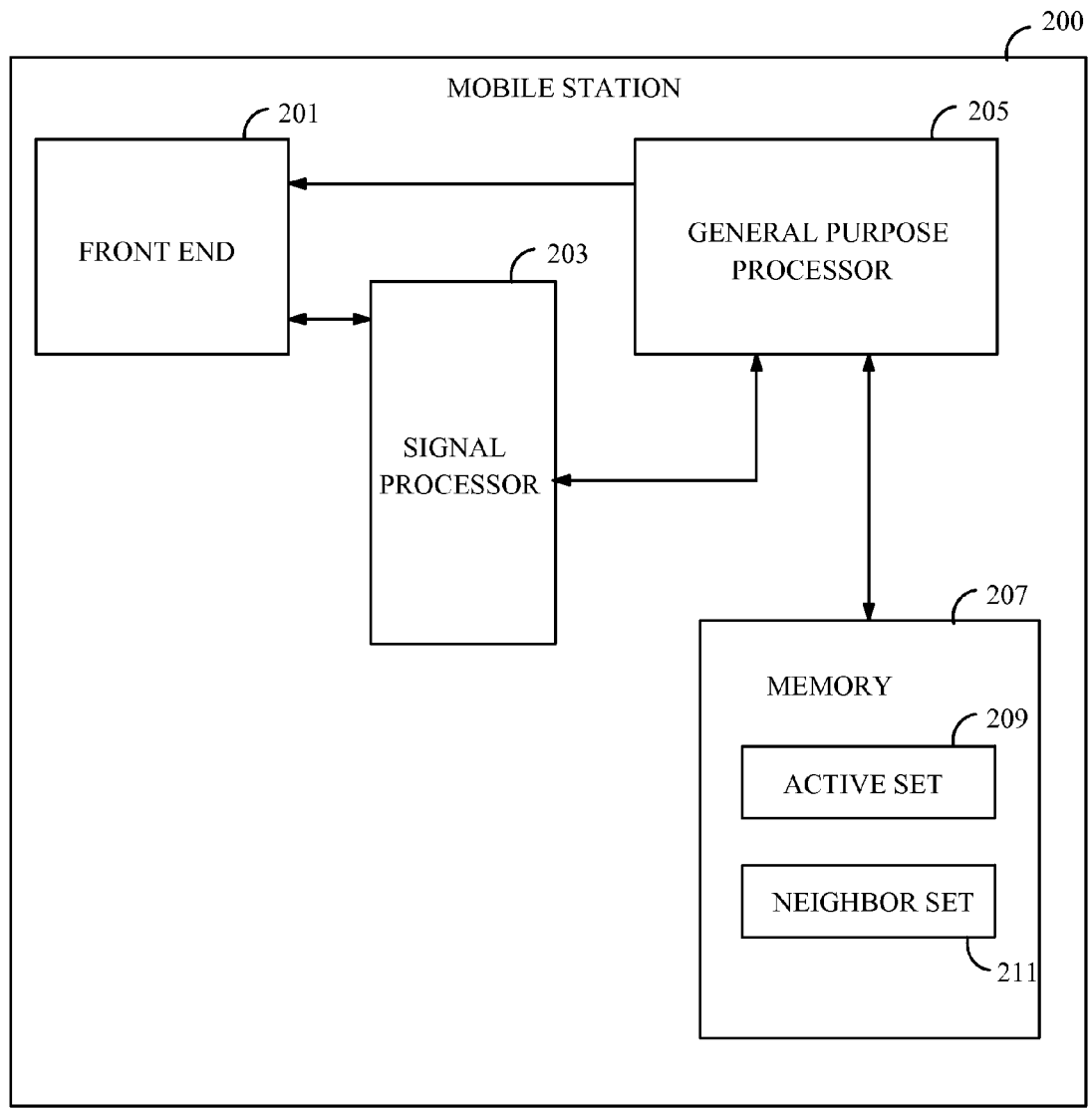
FIG. 2 is an illustration of a mobile station in accordance with one embodiment of the disclosed apparatus.

FIG. 2 is an illustration of a mobile station 200 in accordance with one embodiment of the disclosed apparatus. As shown in FIG. 2, the mobile station 200 has a front end 201, a signal processor 203, a general purpose processor 205, and a memory 207. The memory includes an area 209 in which an "Active Set" is stored, and an area 211 in which a "Neighbor Set" is stored. The function of each of the components of the mobile station 200 will be described below.

Figure 3:
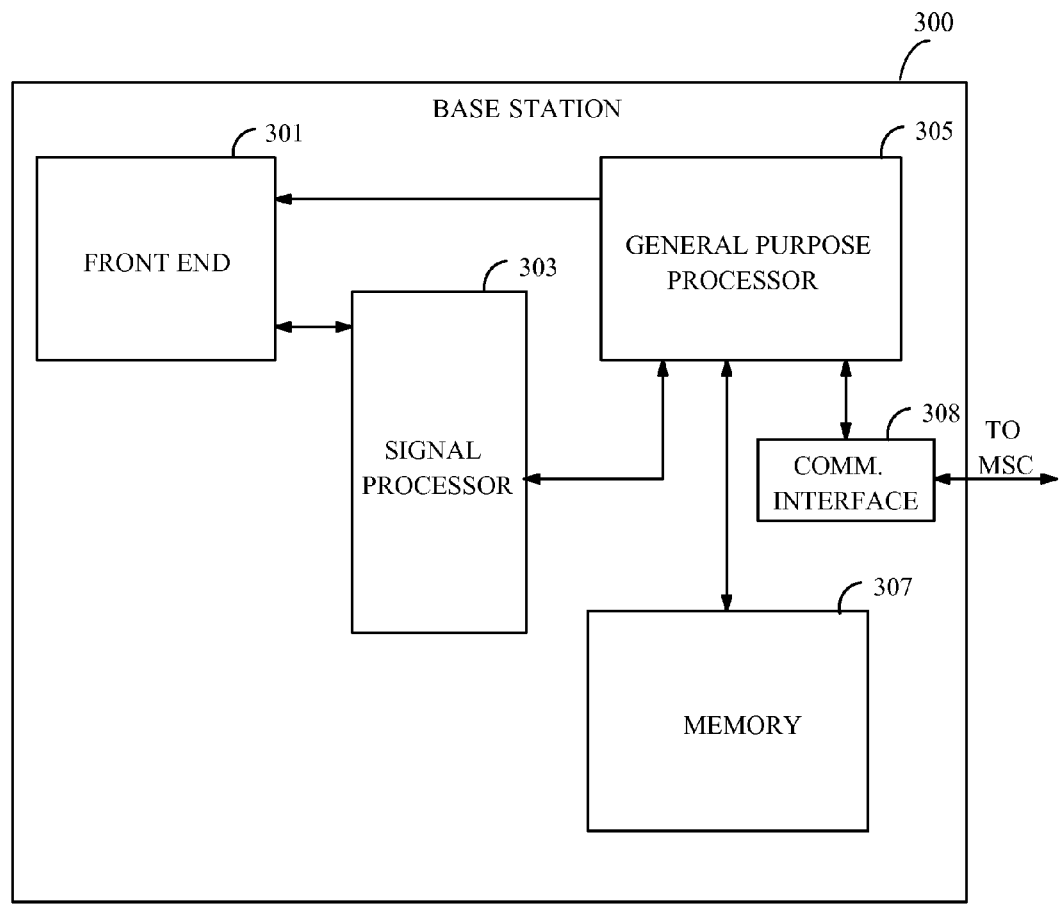
FIG. 3 is an illustration of a base station in accordance with one embodiment of the disclosed apparatus.

FIG. 3 is an illustration of a base station 300 in accordance with one embodiment of the disclosed apparatus. As shown in FIG. 3, the base station has a front end 301, a signal processor 303, a general purpose processor 305, a memory 307, and a communication interface 308. The function of each of the components of the base station 300 will be described below.

Figure 4:
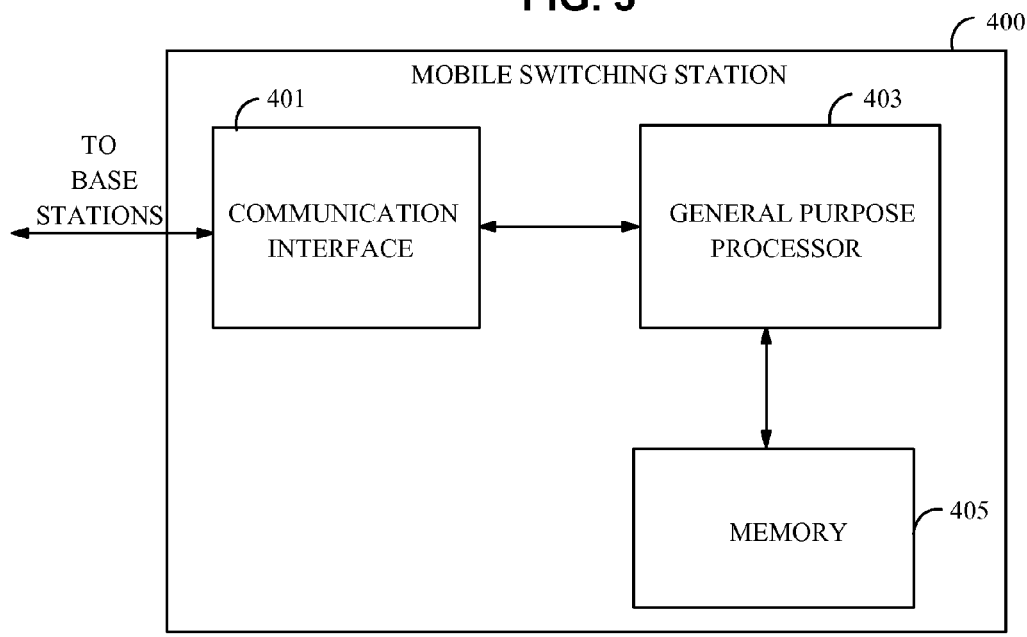
FIG. 4 is an illustration of a mobile switching center (MSC) in accordance with one embodiment of the disclosed apparatus.

FIG. 4 is an illustration of a mobile switching center (MSC) 400 in accordance with one embodiment of the disclosed apparatus. As shown in FIG. 3, the base station has a communication interface 401, a general purpose processor 403, and a memory 405. The function of each of the components of the MSC 400 will be described below.

Figure 5:
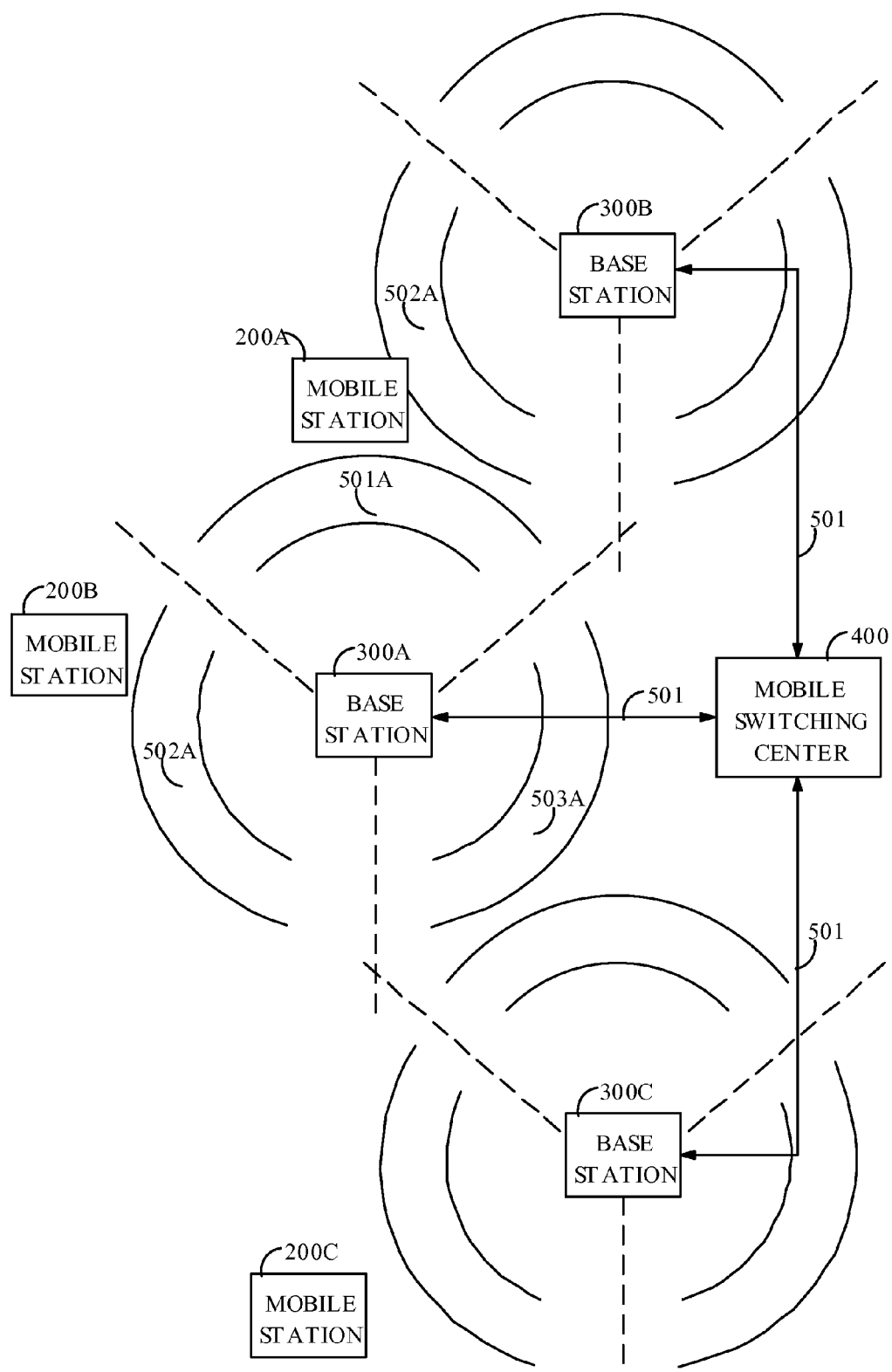
FIG. 5 is an illustration of a communication system that includes mobile stations, the base stations, and an MSC.

FIG. 5 is an illustration of a communication system that includes mobile stations 200, the base stations 300, and an MSC 400. It should be noted that the number of mobile stations, base stations, and MSCs that are shown in FIG. 5 is selected merely to make it convenient to describe the disclosed method and apparatus. However, in systems that incorporate the disclosed method and apparatus, there will typically be a greater number of each of these components. Nonetheless, the relationship between these components will be essentially as shown in FIG. 5.

As shown in FIG. 5, the mobile stations 200 (such as cellular telephones) each move about within a system of base stations 300. Each base station is in communication with an MSC 400. When a call to or from a mobile station 200 is established, the mobile station communicates with the base station 300. The base station relays the "traffic" to the MSC 400. For the purpose of this description, the traffic is that portion of the information that is sent from the mobile station 200 to the base station and which is intended for the device at the other end of the call. The MSC 400 in turn typically sends the traffic to the device at the other end of the call through a land based system, such as the public switched telephone network (PSTN) or over the internet. However, it should be noted that in an alternative embodiment of the disclosed method and apparatus, the MSC 400 may transmit the traffic via an air link, such as a satellite uplink, line of sight microwave link, or other such radio connection. Therefore, it should be understood that there is no limitation to the manner in which the traffic is communicated from the MSC to another device which is at the other end of the call.

In one embodiment of the disclosed method and apparatus, the base stations 300 are arranged to transmit information into three sectors 501, 502, 503. In FIG. 5, one mobile station 200A is in a sector 501A of a first base station 300A, and is concurrently in a sector 502B of a second base station 300B. Therefore, the mobile station 200A will receive a pilot signal from both the base station 300A and the base station 300B. If the mobile station 200A was initially in the sector 501A of the base station 300A, but sufficiently far away from the base station 300B that the pilot signal being transmitted from base station 300B was not above a predetermined threshold, referred to hereafter as the "Active Pilot Threshold", then the following process would occur in accordance with the disclosed method and apparatus.

When the pilot transmitted by the base station 300B is first received by the mobile station 200A at a power level that is above the Active Pilot Threshold, then the mobile station 200A will generate a Pilot Strength Measurement Message (PSMM). Referring to FIG. 2, the pilots from both the base station 300A and the base station 300B will be received by the front end 201 in the mobile station 200A. The signals will preferably be digitized in the front end 201 and the digital representation of the signals coupled to the signal processor 203. The signal processor 203 will determine the signal strength of the pilot signals in conventional fashion. The values of the signal strength of each pilot will then be coupled the general purpose processor 205 to determine whether each pilot is above the Active Pilot Threshold. In addition, a determination will be made as to whether each pilot that is currently being received at a signal strength above the Active Pilot Threshold is currently in the Active Set 209 stored in memory 207. If a pilot is being received at a signal level that is above the Active Pilot Threshold, but is not in the Active Set, then a PSMM will be generated by the general purpose processor 205.

The PSMM will be transmitted to the MSC 400 over the connection 501 between the base stations and the MSC 400 (see FIG. 5). The PSMM will identify each of the pilots that are currently being received at a signal level that is greater than the Active Pilot Threshold.

In addition, the general purpose processor 205 within the mobile station 200 will add each pilot that is being received by the mobile station 200 to the Active Set 209. In one embodiment of the disclosed method and apparatus, the general purpose processor 205 will determine how many pilots are currently in the Active Set. If the Active Set includes more than a desired number of pilots, then the general purpose processor 205 selects the desired number of pilots from among all of the pilots that were presented in the PSMM from the mobile station 200. The decision as to which pilots to include in the Active Set is preferably made by selecting those pilots that were received by the mobile station 200 at the strongest signal levels.

Once a pilot is included in the Active Set 209, the mobile station 200 will demodulate the traffic channel that is being transmitted from the base station associated with that pilot. The information that is required to demodulate the traffic channel for each of the pilots in the Neighbor Set is stored together with the Neighbor Set. A pilot that is to be included in the Active Set should be a neighbor to one of the active pilots (i.e., one of the pilots in the Active Set). Therefore, the information necessary to demodulate the traffic channel of any pilot that is received at a pilot signal strength that is greater than the Active Pilot Threshold should be available to the mobile station 200. In one embodiment of the disclosed method and apparatus, the information that is stored in the Neighbor Set 211 is provided by one or more of the base stations associated with the pilots in the Active Set.

Once the mobile station 200A transmits the PSMM to the base station 300A, the base station 300A relays the PSMM to the MSC 400. Referring to FIG. 3, the base station 300 receives the PSMM on either the reverse traffic channel or a control channel that is time multiplexed, code multiplexed, or otherwise distinguished from the traffic and pilot channels. The PSMM is received by the base station via the front end 301. The PSMM is digitized in the front end 301 and provided to the signal processor 303 for demodulation. The signal processor 303 demodulates the signal and provides the content of the signal to the general purpose processor 305 for transmission to the MSC 400 via the communication interface 308.

Referring to FIG. 4, the MSC 400 receives the content of the PSMM from the base station via the communication interface 401 within the MSC 400. The content of the PSMM is then coupled to the general purpose processor 403. The general purpose processor 403 within the MSC 400 generates an HDM. The HDM is a message that indicates which base stations 300 will be transmitting a forward traffic channel to the mobile station 200A. Since the MSC 400 preferably has the ability to select one or more base stations to transmit traffic, the HDM is essential to inform the mobile station 200A which of the base stations 300 identified by the pilots in the Active Set will truly be transmitting traffic.

The HDM is coupled back to the communication interface 401 within the MSC 400 for transmission to each of the base stations 300 indicated in the PSMM. The HDM is received within each of the base stations 300 by the communication interface 308. The HDM is then coupled to the general purpose processor 305 within each base station 300. Each general purpose processor 305 couples the HDM to the mobile station 200A that sent the PSMM. The mobile station 200A receives the HDM from at least the base station 300B, even if the signals transmitted on the forward traffic channel by base station 300A are no longer strong enough to be received by the mobile station 200A.

It should be understood that even though the disclosed method and apparatus is described as using a PSMM and HDM (terms that are well known in the industry), only the functions that are described herein are relevant to the disclosed method and apparatus. Therefore, if an industry standard PSMM or HDM has other functions, formats, or characteristics which are not referenced in this disclosure, then they are not to be considered as part of the disclosed method and apparatus. In effect, any message format may be used to indicate to the base stations 300 which pilots have been received at levels above the Active Pilot Threshold. Likewise, any message format may be used to indicate to the mobile station 200A which base stations will be transmitting traffic to that mobile station 200A.

Figure 6:
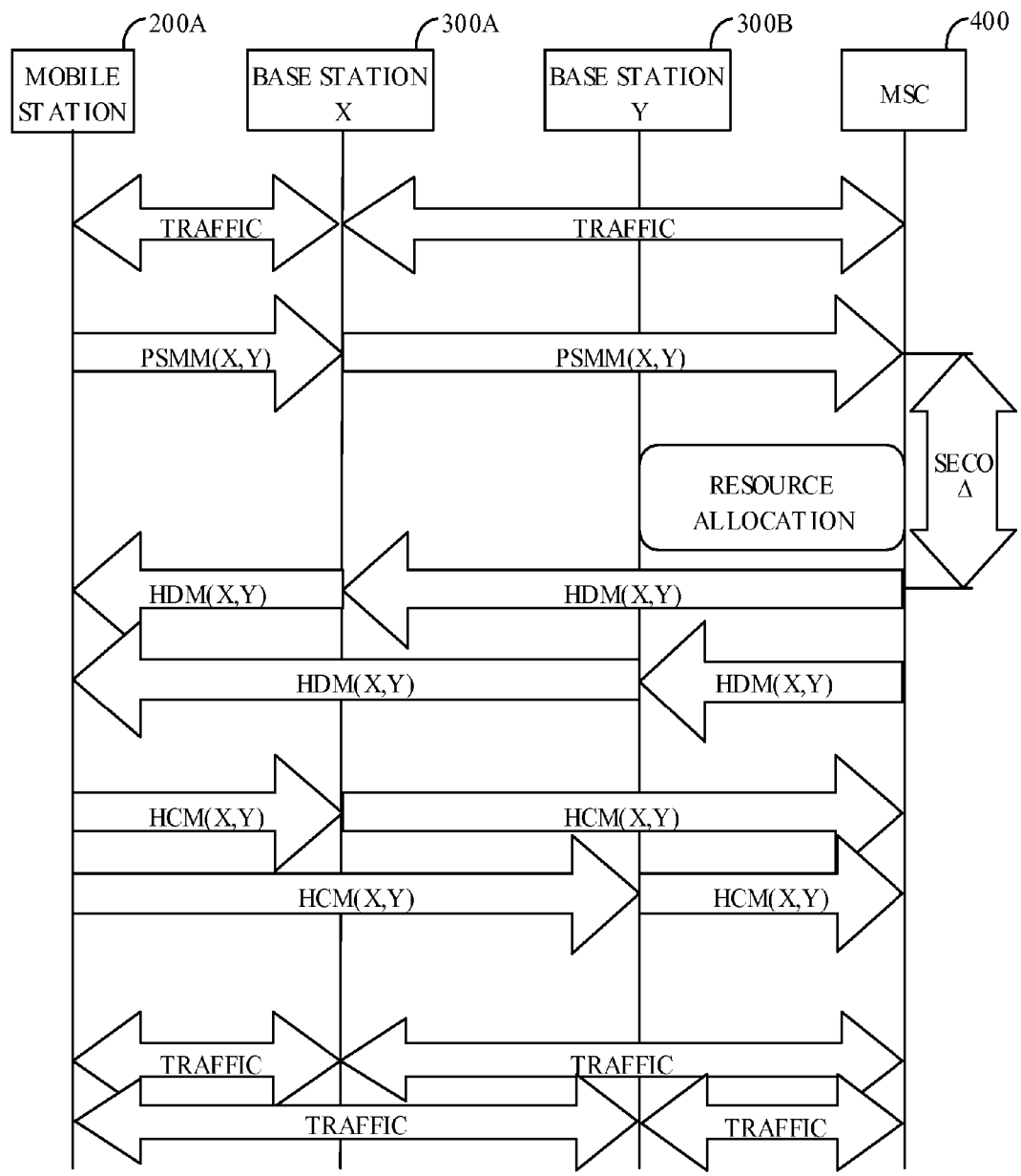
FIG. 6 is an illustration of the flow of messages between the mobile station, the base station X, the base station Y, and the MSC in accordance with the disclosed method and apparatus.

FIG. 6 is an illustration of the flow of messages between the mobile station 200A, the base station 300A, the base station 300B, and the MSC 400 in accordance with the disclosed method and apparatus. As shown in FIG. 6, a traffic channel is initially established between the mobile station 200A and the base station 300A. When the mobile station 200A detects the pilot from base station 300A which is above the Active Pilot Threshold, the mobile station 200A transmits a PSMM to the base station 300A. The PSMM indicates that the mobile station 200A is currently receiving the pilots from both the base station 300A and the base station 300B at levels that are greater than the Active Pilot Threshold. This is indicated in FIG. 6 by the "X" and "Y" in parenthesis following the "PSMM". The PSMM is relayed by the base station 300A to the MSC 400. The MSC 400 communicates with the base station 300B to request resources be allocated by base station 300B to support a traffic channel to and from the mobile station 200A. The MSC 400 then generates and transmits to both the base stations 300A, 300B an HDM indicating that both the base stations 300A, 300B will be establishing traffic channels to the mobile station. The mobile station 200A then generates and transmits a handoff completion message HDC. The HDC is received by the base station 300A and relayed to the MSC 400. The HDC indicates to the MSC 400 that the mobile has successfully received the HDM.

Figure 7:
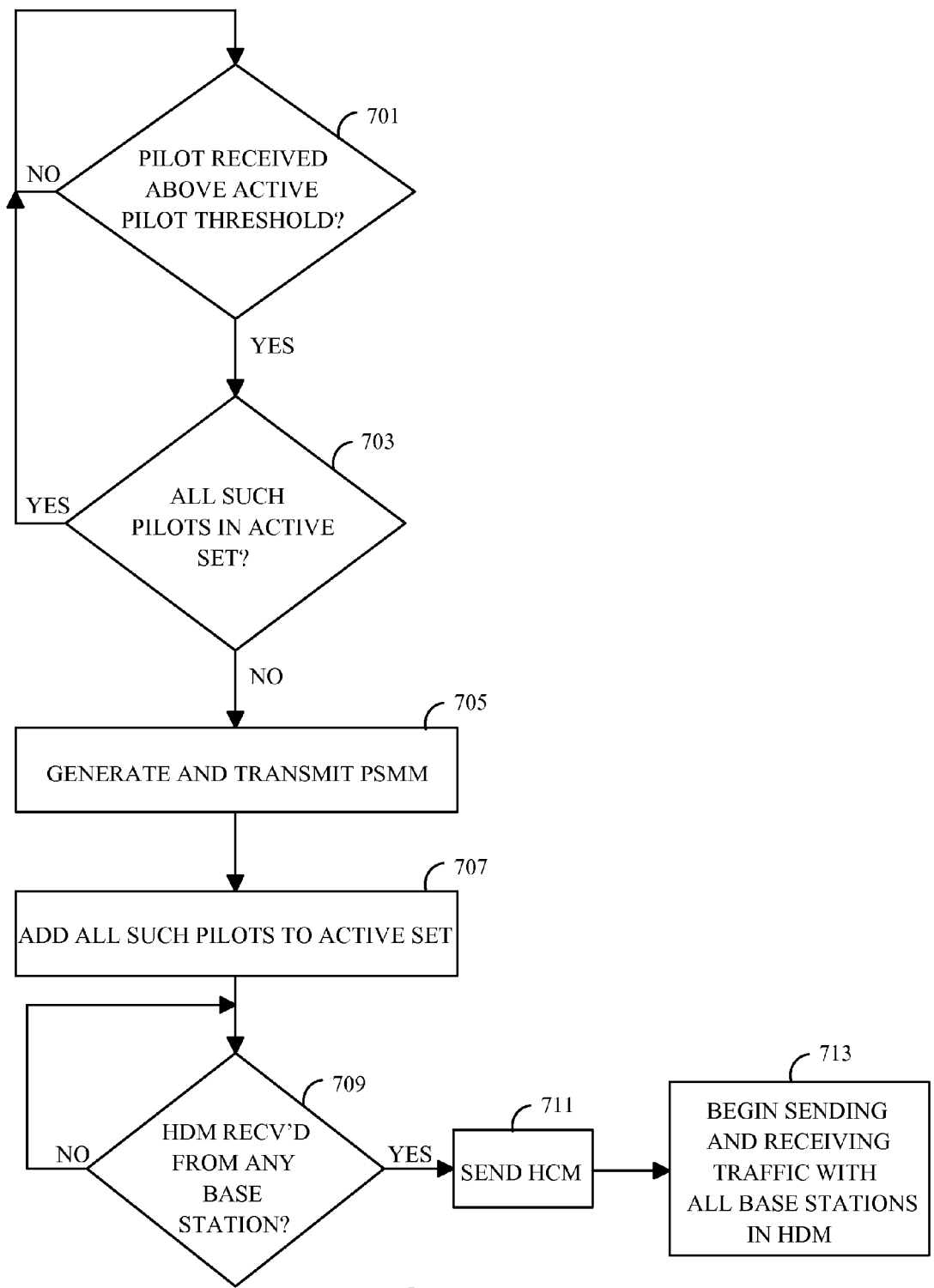
FIG. 7 is a flow chart that indicates the procedure performed by the mobile station in accordance with the disclosed method and apparatus.

FIG. 7 is a flow chart that indicates the procedure performed by the mobile station in accordance with the disclosed method and apparatus. In accordance with the method shown in FIG. 7, the mobile station 200A determines whether any pilots are being received at levels above the Active Pilot Threshold (STEP 701). If any pilots are being received at levels above the Active Pilot Threshold, then the mobile station 200A determines whether each such pilot is in the Active Set 209 (STEP 703). If at least one of these pilots is not in the Active Set 209, then a PSMM is generated and transmitted to the base stations with which the mobile station currently has an established traffic channel (i.e., those base stations 300 associated with pilots that are currently in the Active Set) (STEP 705).

Next, the mobile station 200A places each of the pilots that were received at levels above the Active Pilot Threshold in the Active Set 209 (STEP 707). After placing all of these pilots in the Active Set, the mobile station 200A then monitors the transmissions from each of the base stations associated with pilots in the Active Set in an attempt to receive an HDM (STEP 709). Once an HDM is received, the mobile station 200A generates and transmits an HCM indicating that the handoff has been completed (STEP 711). The mobile station 200A then begins to transmit and receive over the traffic channels to and from each of the base stations indicated in the HDM (STEP 713).

Figure 8:
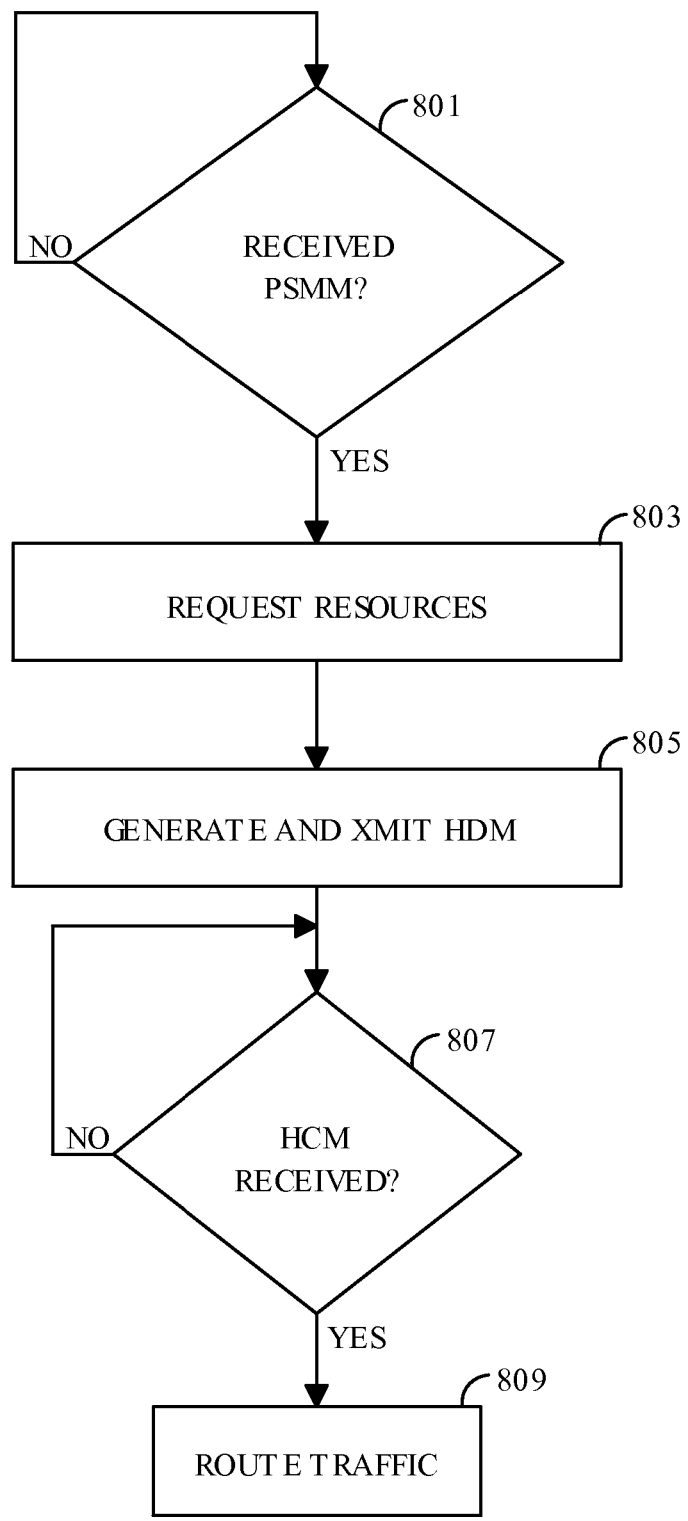
FIG. 8 is a flow chart that indicates the procedure performed by an MSC in accordance with the disclosed method and apparatus.

FIG. 8 is a flow chart that indicates the procedure performed by an MSC in accordance with the disclosed method and apparatus. In accordance with the method shown in FIG. 8, the MSC 400 awaits receipt of a PSMM from the mobile station 200A (STEP 801). Upon receipt of the PSMM, the MSC 400 requests that each of the base stations associated with a pilot identified in the PSMM allocate resources to the mobile station 200A (STEP 803). Alternatively, the MSC 400 only contacts those base station that do not already have a traffic channel to and from the base station 200A. In accordance with one method, upon receiving confirmation that the resources are allocated, the MSC 400 generates and transmits an HDM that indicates which base stations have resources currently allocated to the base station 200a (STEP 805). Alternatively, the HDM only identifies those base stations that have allocated resources in response to the PSMM, and not those that already had resources allocated previous to the receipt of the PSMM. The HDM is preferably transmitted to each of the base stations indicated by the PSMM. In an alternative method, the HDM is transmitted only to those base stations that are identified in the HDM (i.e., those base stations that have successfully allocated resources to the base station 200A). In one method, the HDM is only transmitted to base stations that were recently added to the Active Set.

The MSC 400 then waits for an HCM to be received (STEP 807). The HCM indicates that the handoff is complete. The HCM may be received from the mobile station 200A through all, or only through some, of the base stations that are currently in the Active Set 209.

Upon receipt of the HCM, the MSC 400 begins to route traffic through each of the base stations 300 that were identified in the HCM (STEP 809).

The invention claimed is:

1. An apparatus adapted for wireless communications, comprising:
    means for measuring powers of signals transmitted from a plurality of base station transceivers that are not yet in communication with a mobile station via a traffic channel and a base station transceiver in communication with the mobile station via the traffic channel;
    means for identifying each base station transceiver in the plurality of base station transceivers whose measured signal power is greater than a threshold;
    means for placing indicators of said identified each base station transceiver to an active set prior to receiving a direction message;
    means for transmitting the indicators; and
    means for receiving the direction message from at least one of the identified each base station transceiver in response to the transmission independently of receiving the direction message from the base station transceiver in communication with the mobile station via the traffic channel.

2. The apparatus of claim 1, further comprising means for adjusting the indicators in the active set in accordance with the received direction message.

3. The apparatus of claim 1, further comprising means for determining indicators of said identified each base station transceiver not included in the active set.

4. The apparatus of claim 1, further comprising means for establishing another traffic channel with the at least one of the identified each base station transceiver not in communication with the mobile station.

5. The apparatus of any one of claims 1 to 4, wherein the apparatus further comprises a computer program product to increase efficiency in wireless communications, when coupled to a computing device.

6. A method for wireless communications, comprising:
    measuring powers of signals transmitted from a plurality of base station transceivers that are not yet in communication with a mobile station via a traffic channel and a base station transceiver in communication with the mobile station via the traffic channel;
    identifying each base station transceiver in the plurality of base station transceivers whose measured signal power is greater than a threshold;
    placing indicators of said identified each base station transceiver to an active set prior to receiving a direction message;
    transmitting the indicators; and
    receiving the direction message from at least one of the identified each base station transceiver in response to the transmission independently of receiving the direction message from the base station transceiver in communication with the mobile station via the traffic channel.

7. The method of claim 6, further comprising adjusting the indicators in the active set in accordance with the received direction message.

8. The method of claim 6, further comprising determining indicators of said identified each base station transceiver not included in the active set.

9. The method of claim 6, further comprising establishing another traffic channel with the at least one of the identified each base station transceiver not in communication with the mobile station.

10. A computer program product, comprising:
   a non-transitory computer-readable medium having program code recorded thereon, the program code comprising:
   code for measuring powers of signals transmitted from a plurality of base station transceivers that are not yet in communication with a mobile station via a traffic channel and a base station transceiver in communication with the mobile station via the traffic channel;
   code for identifying each base station transceiver in the plurality of base station transceivers whose measured signal power is greater than a threshold;
   code for placing indicators of said identified each base station transceiver to an active set;
   code for transmitting the indicators; and
   code for receiving the direction message from at least one of the identified each base station transceiver in response to the transmission independently of receiving the direction message from the base station transceiver in communication with the mobile station via the traffic channel.

11. The computer program product of claim 10, further comprising code for adjusting the indicators in the active set in accordance with the received direction message.

12. The computer program product of claim 10, further comprising code for determining indicators of said identified each base station transceiver not included in the active set.

13. An apparatus adapted for wireless communications, comprising:
   a memory; and
   at least one processor configured to measure powers of signals transmitted from a plurality of base station transceivers that are not yet in communication with a mobile station via a traffic channel and a base station transceiver in communication with the mobile station via the traffic channel, to identify each base station transceiver in the plurality of base station transceivers whose measured signal power is greater than a threshold and to place indicators of said identified each base station transceiver to an active set, to transmit the indicators and to receive the direction message from at least one of the identified each base station transceiver in response to the transmission independently of receiving the direction message from the base station in communication with the mobile station via the traffic channel.

14. The computer program product of claim 10, further comprising code for establishing another traffic channel with the at least one of the identified each base station transceiver not in communication with the mobile station.

15. The apparatus of claim 13, wherein the at least one processor is further configured to adjust the indicators in the active set in accordance with the received direction message.

16. The apparatus of claim 13, wherein the at least one processor is further configured to determine indicators of said identified each base station transceiver not included in the active set.

17. The apparatus of claim 13, wherein the at least one processor is further configured to establish another traffic channel with the at least one of the identified each base station transceiver not in communication with the mobile station.

* * * * *